(12) United States Patent
Smith

(10) Patent No.: US 10,409,793 B2
(45) Date of Patent: Sep. 10, 2019

(54) SECURE AND FLEXIBLE INTER-PROGRAM COMMUNICATION

(71) Applicant: Bank of America Corporation, Charlotte, NC (US)

(72) Inventor: Terence Smith, Madison, NJ (US)

(73) Assignee: Bank of America Corporation, Charlotte, NC (US)

( * ) Notice: Subject to any disclaimer, the term of this patent is extended or adjusted under 35 U.S.C. 154(b) by 764 days.

(21) Appl. No.: 15/079,823

(22) Filed: Mar. 24, 2016

(65) Prior Publication Data

US 2016/0292195 A1 Oct. 6, 2016

Related U.S. Application Data

(60) Provisional application No. 62/142,597, filed on Apr. 3, 2015.

(51) Int. Cl.
| | |
|---|---|
| *G06F 16/00* | (2019.01) |
| *G06F 16/22* | (2019.01) |
| *G06F 21/62* | (2013.01) |
| *G06F 16/25* | (2019.01) |

(52) U.S. Cl.
CPC ............ *G06F 16/221* (2019.01); *G06F 16/25* (2019.01); *G06F 21/6218* (2013.01)

(58) Field of Classification Search
CPC ............. G06F 17/30557; G06F 16/221; G06F 21/6218; G06F 16/25

USPC ......................................................... 707/601
See application file for complete search history.

(56) References Cited

U.S. PATENT DOCUMENTS

| | | | |
|---|---|---|---|
| 7,596,526 B2 * | 9/2009 | Blauvelt ................ | G06Q 40/02 705/37 |
| 2003/0149759 A1 * | 8/2003 | Hetherington ......... | G06Q 10/06 709/223 |
| 2015/0169667 A1 * | 6/2015 | Roth .................. | G06F 17/30557 707/691 |
| 2015/0254330 A1 * | 9/2015 | Chan ................. | G06F 17/30598 707/613 |

\* cited by examiner

*Primary Examiner* — Monica M Pyo
(74) *Attorney, Agent, or Firm* — Michael A. Springs

(57) ABSTRACT

In one embodiment, a method for providing secure and flexible inter-program communication includes storing an ontology in a first data store, the ontology includes a plurality of business semantics for an application, a plurality of rules for storing data in a database, and a plurality of rules for displaying the data in a browser. The method further includes receiving a new data type to add to the database and updating the ontology to describe the new data type. Updating the ontology includes updating the plurality of rules for storing the new data type in the database and updating the plurality of rules for displaying the new data type in the browser. In response to updating the ontology, generating a new column for the new data type in the database and communicating the new data type for presentation in the browser.

20 Claims, 2 Drawing Sheets

SECURE AND FLEXIBLE INTER-PROGRAM COMMUNICATION

CROSS-REFERENCE TO RELATED APPLICATION

This application claims the benefit of U.S. Provisional Application Ser. No. 62/142,597 filed on Apr. 3, 2015, entitled "Ontology Based Data Integration," which is commonly assigned with this application and incorporated herein by reference.

TECHNICAL FIELD

The present invention relates generally to the field of application development and, more specifically, to secure and flexible inter-program communication.

BACKGROUND

Enterprises develop and maintain a number of databases related to their lines of business. An enterprise may have business logic that interacts with the databases to run one or more applications. Overtime, these databases may evolve to include new data fields and new facts in response to enterprise needs. Enterprises spend significant resources maintaining their databases and applications.

SUMMARY

In accordance with the present disclosure, disadvantages and problems associated with secure and flexible inter-program communication may be reduced or eliminated.

In certain embodiments, an apparatus for secure and flexible inter-program communication includes a data store configured to store an ontology. The ontology may include a plurality of business semantics for an application, a plurality of rules for storing data in a database, and a plurality of rules for displaying the data in a browser. The apparatus may include an interface communicatively coupled to the data store. The interface may be configured to receive data to add to the database. The apparatus may also include a processor communicatively coupled to the data store and the interface. The processor may be configured to update the ontology to describe the new data. Updating the new data may include updating the plurality of rules for storing the new data in the database and updating the plurality of rules for displaying the new data in the browser. In response to updating the ontology, the processor is further configured to generate a new column for the new data in the database and communicate the new data for display in the browser.

In one embodiment, a method for secure and flexible inter-program communication includes storing an ontology in a first data store, the ontology includes a plurality of business semantics for an application, a plurality of rules for storing data in a database, and a plurality of rules for displaying the data in a browser. The method further includes receiving a new data type to add to the database and updating the ontology to describe the new data type. Updating the ontology includes updating the plurality of rules for storing the new data type in the database and updating the plurality of rules for displaying the new data type in the browser. In response to updating the ontology, generating a new column for the new data type in the database and communicating the new data type for presentation in the browser.

According to another embodiment, one or more computer-readable non-transitory storage media embodies software that is operable when executed to store an ontology in a data store. The ontology may include a plurality of business semantics for an application, a plurality of rules for storing data in a database, and a plurality of rules for displaying the data in a browser. The media may further be configured to receive a new data type to add to the database and update the ontology to describe the new data type. Updating the ontology may include updating the plurality of rules for storing the new data type in the database and updating the plurality of rules for displaying the new data type in the browser. In response to updating the ontology, the media may also generate a new column for the new data type in the database and communicate the new data type for presentation in the browser.

Certain embodiments may provide a number of technical advantages related to ontology driven application development, data integration, and data conversion. One advantage of the present disclosure reduces the number of reference data applications by providing a semantically driven ontology that homogenizes different data representations. This ontology process may reduce the memory requirements of a system and increase processor efficiency when conducting queries and updating databases. Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
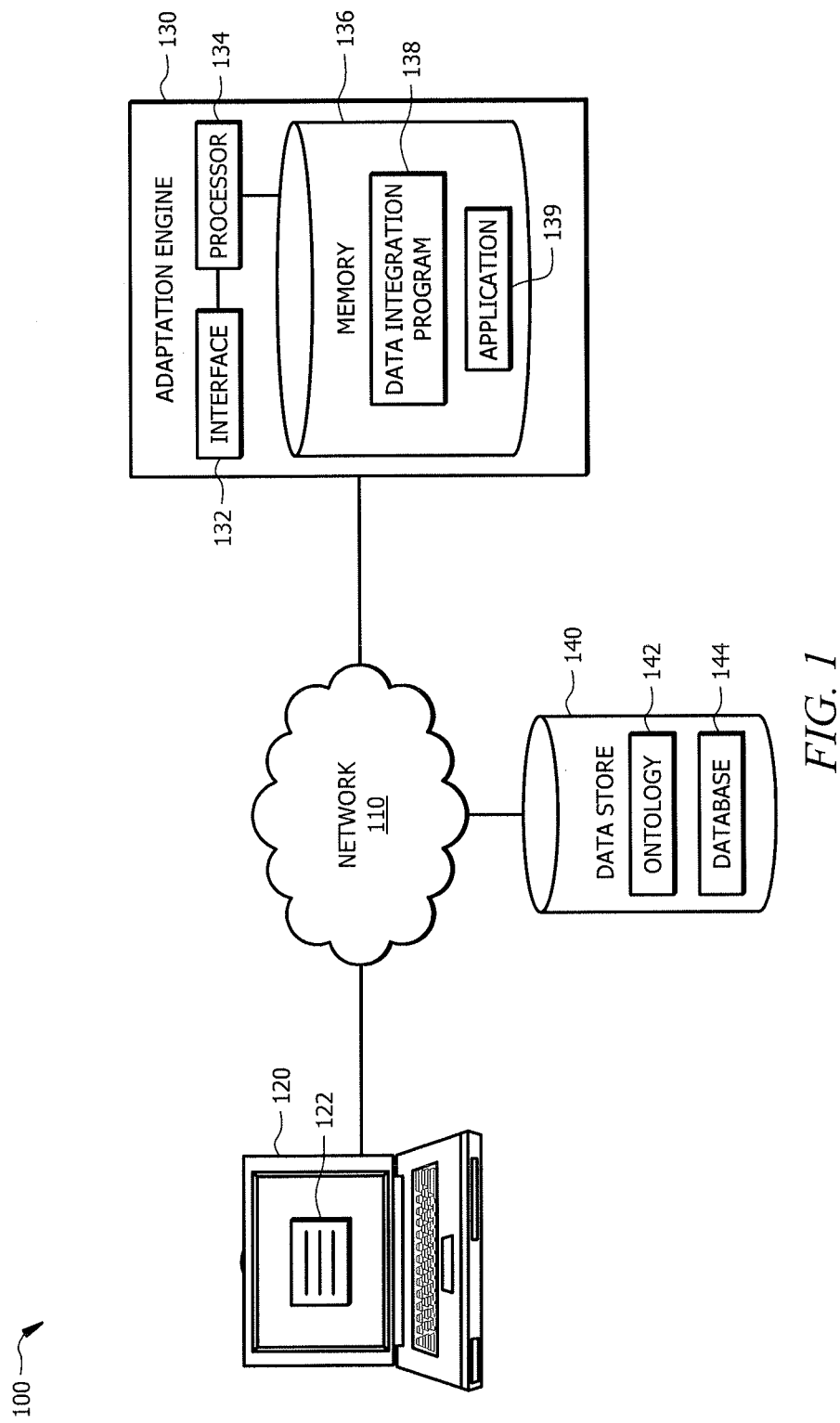
FIG. 1 illustrates an example system for secure and flexible inter-program communication.
Figure 2:
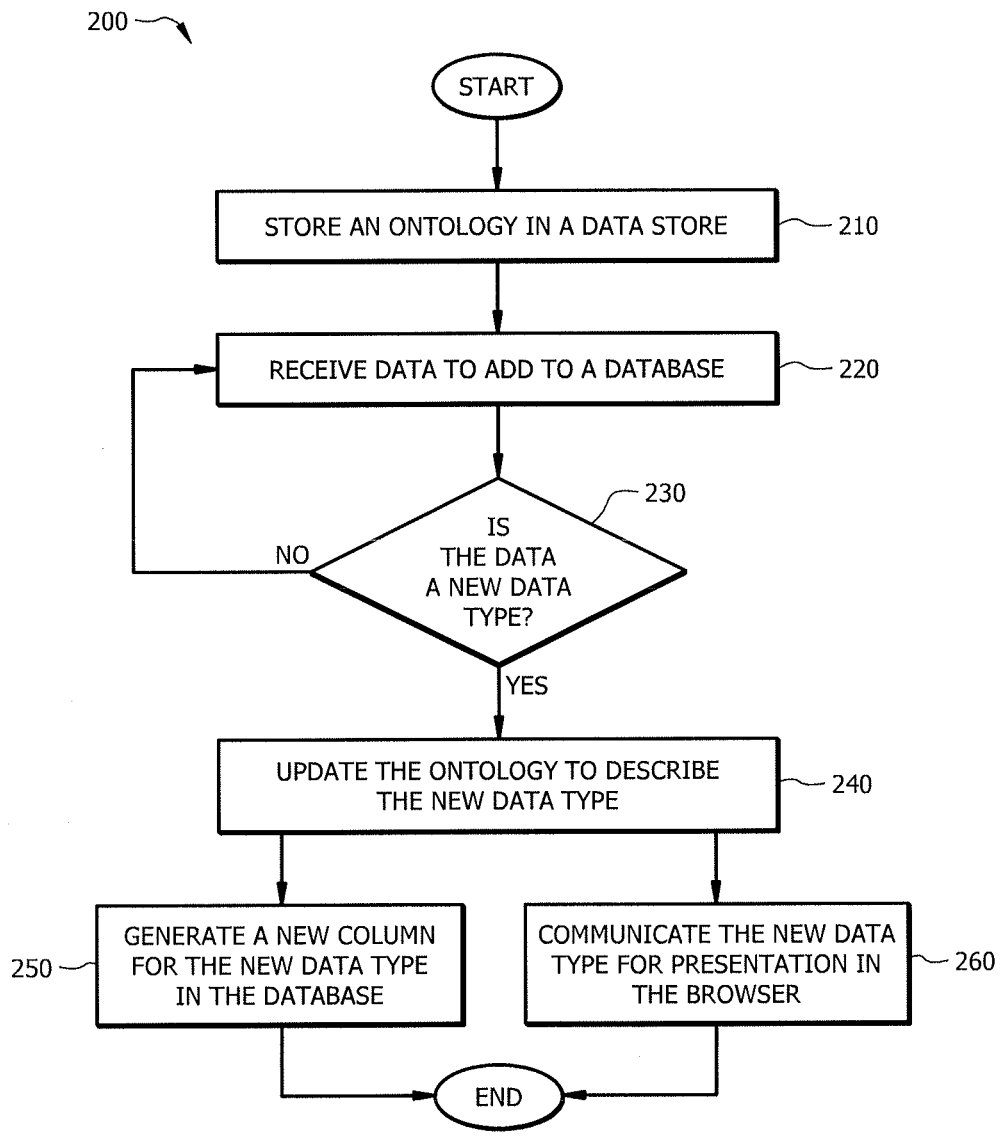
FIG. 2 is a flowchart of a method for updating an application using secure and flexible inter-program communication.

Embodiments of the present disclosure and its advantages are best understood by referring to FIGS. 1-2, like numerals being used for like and corresponding parts of the various drawings.

Enterprises develop and maintain a number of databases related to their lines of business. An enterprise may have business logic that interacts with the databases to run one or more applications. Overtime, these databases may evolve to include new data fields and new facts in response to enterprise needs. Enterprises spend significant resources updating and revising their databases and applications.

An enterprise may desire an application that can seamlessly adapt when faced with new data and data types. Traditional applications based on semantically driven data stores utilize Relational Database Management System (RDBMS) environments as a base to structure the semantic representation of the data being stored. In these traditional systems, an intermediate layer is usually needed to map SPARQL statements into SQL. However, applications are limited in how they may adapt and expand to new types of data based on the rigidity of the underlying databases. Furthermore, traditional systems resist flexibility in the use of non-homogenized data representations.

Under the traditional framework, if an enterprise wanted to update an application database to include a new type of data, the enterprise would need to make fundamental changes to the schema structure. Thus, adding a new fact to a database required a development team to add additional columns to the database table. Another team may be required to change the storage procedures for reading and writing to the database. Yet another team may need to alter the business logic interacting with the database and update the user interface to incorporate the new data types. Thus, a request to add a new data type to an existing database may result in a time, labor, and resource intensive revision process.

Embodiments of the present disclosure offer numerous advantages over the traditional process. The ontology driven data integration systems and methods disclosed provide inherent flexibility and vertical scaling when designing and updating an application database.

For example, in some embodiments, an enterprise may wish to add a new type of data to an existing application. To accommodate the new data type, the application's ontology is updated to describe a new type of data and how that new data type affects the application. The ontology may describe a number of relationships and rules that interact with the new data type. For example, and not by way of limitation, the ontology may describe the business semantics related to the application, how the application platform receives raw data, what format the raw data is converted to, how the converted data is rendered, how the data is communicated through the system, the permissions and entitlements attached to the data, and how the application's browser views, sorts, and displays the data. The ontology may describe any number of definitions and relationships between various components of a system.

Embodiments of the present disclosure may also address problems rooted in computer technology. For instance, an enterprise may have one or more systems that rely on input data from various data streams. However, the data streams may provide the input data in a number of various and/or incompatible formats. To effectively describe the relationships between data in the data streams, the ontology may describe how the system should homogenize the disparate data types as they are received by the system. Therefore, when a new data stream is added to the system, the ontology may automatically convert the new data type to a data type used by the system. This issue has no pre-computer analog—the problem only exists because different networks and databases rely on different schemas and protocols to communicate and store information.

The system may then update to reflect the changes made to the ontology. For instance, the application's database may include a column for the new data type. The browser may update to accept queries for the new data type, and the system may communicate the data downstream based on the permissions and entitlements described by the ontology. Thus, creating an ontology based data integration system removes the need to manually change lines of code, system interfaces, database schemas, or have multiple databases for different types of raw data.

FIG. 1 illustrates an example system 100 for secure and flexible inter-program communication. System 100 includes workstation 120, adaptation engine 130, and data store 140, which communicate through network 110.

In certain embodiments, the components of system 100 may occur within an enterprise. An enterprise may be an individual, business, company, or other organization. The enterprise may have one or more lines of business. An example of an enterprise may include an individual store, such as a standalone bookstore. In other embodiments, an enterprise may be a corporation, such as a financial institution.

Network 110 represents any suitable network operable to facilitate communication between the components of system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

Workstation 120 enables one or more users to monitor, administer, or otherwise interact with adaptation engine 130 and data store 140. Workstation 120 may include one or more laptops, personal computers, monitors, display devices, handheld devices, smartphones, servers, user input devices, or other suitable components for enabling user input. Workstation 120 may itself include adaptation engine 130 and data store 140. In the illustrated embodiment, workstation 120 includes browser 122.

In certain embodiments, workstation 120 may communicate with adaptation engine 130 and data store 140 to facilitate secure and flexible inter-program communication. Workstation 120 may interface with adaptation engine 130 and data store 140 to update ontology 142 and submit queries through browser 122. Browser 122 may provide an interface to utilize application 139. In certain embodiments, browser 122 may allow a user to interact with ontology 142 and database 144.

In certain embodiments, database 144 may be a resource description framework ("RDF") database (e.g., a triplestore) and ontology 142 may be an RDF ontology. Browser 122 may then allow a user to browse a graph of the RDF database while examining the RDF ontology. Having the ability to visualize both the RDF database and the RDF ontology provides enhanced transparency for the user when adapting or updating application 139. In certain embodiments, browser 122 may also display a graphical user interface ("GUI") for one or more APIs that interface with adaptation engine 130.

Adaptation engine 130 represents any suitable components that facilitate secure and flexible inter-program communication. Adaptation engine 130 includes any suitable components that facilitate semantically driven flexibility in the homogenization of disparate data representations. Adaptation engine 130 may include a network server, remote server, mainframe, host computer, workstation, web server, personal computer, file server, or any other suitable device operable to communicate with other devices and process data. In some embodiments, adaptation engine 130 may execute any suitable operating system such as IBM's zSeries/Operating System (z/OS), MS-DOS, PC-DOS, MAC-OS, WINDOWS, UNIX, OpenVMS, Linux, or any other appropriate operating systems, including future operating systems.

The functions of adaptation engine 130 may be performed by any suitable combination of one or more servers or other components at one or more locations. In the embodiment where the modules are servers, the servers may be public or private servers, and each server may be a virtual or physical server. The server may include one or more servers at the same or at remote locations. Adaptation engine 130 may also include any suitable component that functions as a server. In some embodiments, workstation 120 and data store 140 may be integrated with adaptation engine 130 or they may operate as part of the same device or devices.

In the illustrated embodiment, adaptation engine 130 includes an interface 132, processor 134, and memory 136, which comprises data integration program 138 and application 139.

Interface 132 represents any suitable device operable to receive information from network 110, transmit information through network 110, perform suitable processing of the information, communicate to other devices, or any combination thereof. Interface 132 represents any port or connection, real or virtual, including any suitable hardware and/or software, including protocol conversion and data processing capabilities, to communicate through a LAN, WAN, or other communication system that allows adaptation engine 130 to exchange information with network 110, workstation 120, data store 140, one or more APIs (not pictured) or any other components of system 100.

Interface 132 may facilitate secure and flexible inter-program communication by interacting with workstation 120 and data store 140. For example, interface 132 may communicate data updates to database 144, receive queries from browser 122, and facilitate communication between workstation 120 and data store 140. In certain embodiments, application 139 may be a program designed to track complex derivatives in an exchange and update database 144 with changes to the market. Interface 132 may communicate with one or more trading databases to retrieve market information and update database 144.

Processor 134 communicatively couples interface 132 and memory 136 and controls the operation of adaptation engine 130. Processor 134 includes any hardware and software that operates to control and process information. To streamline the secure and flexible inter-program communication of system 100, processor 134 may perform a number of tasks such as processing and translating input data and queries, facilitate the storage of data in database 144, and facilitating updates to ontology 142.

In certain embodiments, processor 134 may convert data from a first data type to a second data type. For example, adaptation engine 130 may receive data from workstation 120 in XML format and processor 134 may convert the XML data into RDF. Processor 134 may support the conversion of a number of data formats into RDF. For instance, and not by way of limitation, processor 134 may convert OFX, SDMX, Excel, Javadoc, Java bytecode, Outlook, XMP, or any other suitable data type into RDF. In this manner, processor 134 may facilitate the homogenizing of data.

Processor 134 may also facilitate the storage and analysis of data in database 144. For example, database 144 may be a bi-temporal database used for storing customer account information. Processor 134 may store a fact (i.e., data) in database 144 and associate the storing of the fact with a first system starting time, a first system ending time, a first business starting time, and a first business ending time. Processor 134 may create a second version of the fact at a second system starting time, wherein the second version of the fact is associated with a second business starting time and a second business ending time. Workstation 120 may then query database 144 to determine the status of the account at a particular business time or a particular system time. In certain embodiments, processor 134 charts the bi-temporal data via a single stream. In some embodiments, processor 134 may conduct parallel stream bi-temporal charting.

Processor 134 may also implement data quality rules. In certain embodiments, there may be multiple adaptation engines writing and reading data to database 144. In order to ensure data quality in system 100, processor 134 may schedule backups, perform de-duplication, consolidate files, and perform load balancing between various modules.

In some embodiments, processor 134 may implement entitlements when using interface 132 to communicate the data to workstation 120. For example, ontology 142 may describe which users of workstation 120 have access to which types of data based on a number of entitlements.

For example, application 139 may be a pricing catalogue for a department store. Database 144 may include a number of products, identification numbers, and prices. Ontology 142 may describe the entitlements associated with each product. For example, the department store may determine that they want to add a new data category describing rebates for specific products. Ontology 142 may be updated via workstation 120 to describe how rebates work in application 139 including the entitlements associated with rebate data. Changes to ontology 142 may then automatically be reflected in system 100. Database 144 may include a new column for the rebate data, browser 122 may update to display information and accept queries related to the rebate data, and processor 134 may determine whether a user logging in to workstation 120 has manager credentials before granting the user access to rebate data in database 144. In this manner, changes to ontology 142 may result in the seamless integration of a new data type affecting multiple components of system 100.

Memory 136 stores, either permanently or temporarily, data, operational software, other information for processor 134 or other components of system 100. Memory 136 includes any one or a combination of volatile or nonvolatile local or remote devices suitable for storing information. For example, memory 136 may include RAM, ROM, flash memory, magnetic storage devices, optical storage devices, network storage devices, cloud storage devices, solid state devices, or any other suitable information storage device or a combination of these devices. Memory 136 may store information in one or more databases, file systems, tree structures, any other suitable storage system, or any combination thereof. Furthermore, information stored in memory 136 may use any of these storage systems. Moreover, any information stored in memory 136 may be encrypted or unencrypted, compressed or uncompressed, and static or editable. Although illustrated as including a particular module, memory 136 may include any suitable information for use in the operation of adaptation engine 130.

In the illustrated embodiment, memory 136 includes data integration program 138 and application 139.

In certain embodiments, data integration program 139 may represent one or more APIs that facilitate interaction with browser 122, adaptation engine 130, application 139, data store 140, ontology 142, and database 144. For example, database 144 may be an RDF data model. An API may facilitate RDF queries using parameterized SPARQL, read RDF graphs, or updates to ontology 142.

Application 139 represents any suitable program that an enterprise may develop that may be based on ontology 142 and utilize database 144. For example, a department store may develop application 139 to develop and track a product catalogue. Database 144 may include information such as product names, identification numbers, product prices, and product costs. Ontology 142 may describe the business rules and business semantics for the product catalogue application. In another embodiment, application 139 organizes and tracks complex financial transactions having multiple dependencies, entities, and contingencies.

Data store 140 represents any database, system, or computer that is capable of storing ontology 142 and database 144. Data store 140 may be cloud based and may be capable of representing data in one or more schemas. Data store 140 may be scalable and be capable of facilitating a high number of read/write transactions and queries. In the illustrated embodiment, data store 140 includes ontology 142 and database 144. Although the illustrated embodiment shows ontology 142 and database 144 stored in the same data store 140, ontology 142 and database 144 may be stored in any manner that allows for secure and flexible inter-program communication.

Ontology 142 provides a formal set of vocabulary and definitions for the data of database 144 used by application 139. Ontology 142 may define the relationships, properties, and rules for the data of database 144 based on application 139. Ontology 142 may define the structure of application 139 by using nouns that relate to classes of objects and verbs representing the relationships between the objects.

Ontology 142 of system 100 may describe the business semantics relating to application 139. The ontology of system 100 may also describe how application 139 procures, stores, sorts, renders, and transmits data throughout system 100. Ontology 142 may describe how browser 122 displays the data and how users view the data. In some embodiments, ontology 142 may describe downstream permissions and entitlements, and provide rules for analyzing data quality.

The business semantics of ontology 142 may include a common business vocabulary and XMI schema for the interchange and interoperability of business vocabularies, definitions, and business rules between multiple enterprises and systems. In certain embodiments, ontology 142 may be an RDF ontology relying on RDF Schema (RDFS).

RDF provides a general method for conceptualizing and describing information on the Semantic Web, i.e., the structured yet decentralized information spread across the web. RDF data (facts) may be described as a subject-predicate-object triple or be represented as a graph. In certain embodiments, database 144 stores RDF data as both a set of statements and as a graph.

Database 144 may be any type of database that that allows for a secure and flexible system for inter-program communication. Database 144 may be a relational database, a triplestore, a RDF database, a temporal (including bi-temporal and multi-temporal) database, a parallel database, an operational database, a spatial database, a graph store, or any other suitable database.

In an example embodiment, database 144 may be a bi-temporal database that handles data (facts) involving time periods, where each time period includes a starting time and an ending time. When data is stored in a bi-temporal database the data is associated with both a system time and a business time. A system time is the period during which a fact stored in the database is considered to be true. A business time is the period during which a fact is considered to be true with respect to the real world.

Bi-temporal databases enable recapture of information "as it actually was" along with "as it was recorded" at a past moment in time, as such, bi-temporal databases may provide one or more advantages to enterprises, such as financial institutions, that need to maintain detailed records for auditing purposes.

Database 144 may store any number of data and data types. For example, application 139 may be used to track information regarding an enterprise's customers. Database 144 may be an operational database used to store information about each customer that the enterprise deems valuable, such as the customer's name, dates the customer made a purchase, what the customer has purchased historically, and the amount of money the customer spends during each transaction.

In another example, database 144 may include reference data. Reference data provides standard identifiers and data retrieval mechanisms to describe data for a given application. Depending on the industry, the reference data may conform to industry standards or may be proprietary. For example, a stand-alone bookstore may create their own identification system to identify the books and products sold in the bookstore. A chain of grocery stores may have a company-wide system for identifying different types of food, merchandise, store locations, or promotional sales. A business in a regulated or standards-driven industry may utilize industry common identifiers. For instance, a financial institution may rely on the CUSIP system to identify securities in a trading database. A brokerage firm may rely on commonly used names for exchanges (e.g., NYSE, NASDAQ, LSE, JPX).

Incorporating standardized identifiers may provide one or more benefits to an enterprise. One benefit may be providing efficient support for the enterprise during regulatory audits. Using standardized identifiers may also promote interoperability between different databases and applications.

A component of system 100 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to system 100 without departing from the scope of the invention. In certain embodiments, adaptation engine 130 may include additional applications that perform different operations using database 144. In some embodiments, adaptation engine 130 may facilitate a public key encryption system (e.g., X509) or any other authentication system with workstation 120 when communicating data between workstation 120, adaptation engine 130, and data store 140. In other embodiments, workstation 120 may be accessible by a third party and ontology 142 is capable of defining custom templates for browser 122 based on the third-party. In certain embodiments, adaptation engine 130 and data store 140 may be integrated. Any suitable logic may perform the functions of system 100 and the components within system 100.

FIG. 2 is a flowchart of a method 200 for updating an application for secure and flexible inter-program communication. At step 210, adaptation engine 130 stores ontology 142 in data store 140. Ontology 142 may comprise a plurality of business semantics for describing an application, a plurality of rules for storing data in database 144, and a plurality of rules for displaying the data in browser 122. In certain embodiments, ontology 142 is an RDF ontology and database 144 is a bi-temporal database. For example, a car rental company may maintain application 139 for tracking and renting the company's rental cars. Database 144 may include a number of facts regarding each rental car such as the car's make and model, VIN number, color, license number, rental value, and availability. Ontology 142 may describe a number of interactions between browser 122, database 144, and adaptation engine 130. For example, ontology 142 may describe the business semantics for rental car application 139, how the various types of data are stored in database 144, and how the data is viewed and sorted in browser 122.

At step 220, adaptation engine 130 receives a new fact to add to database 144. In some embodiments, the new fact may be sent from workstation 120 or be derived based on the interaction of data in database 144. For example, the rental car company may wish to add a new fact to database 144 to describe how many miles are currently on each rental car. At step 230, adaptation engine 130 may determine whether the new data is a new data type or an existing data type. If the received data is a pre-existing data type then the data may be stored in database 144 according to ontology 142 and the sequence returns to step 220 and waits to receive more data. If the data is a new data type then the sequence proceeds to step 240.

At step 240, ontology 142 is updated to describe the new data type. Ontology 142 may be updated to define how the new data type is stored in database 144 and how the new data type will be displayed in browser 122. For example, the car rental company, wishing to include new information on the amount of miles a rental car has, may update ontology 142 to incorporate the new information. The update to ontology 142 may affect how browser 122 displays the mileage data, and how the mileage data interacts with other data types.

At step 250, in response to changing ontology 142, database 144 updates and generates a new column to accommodate the new data type. For example, the new data type may be a new attribute in a relationship database and database 144 may add a new column to accommodate the new data type. At step 260, the new data type is communicated to workstation 120 for presentation in browser 122.

Various embodiments may perform some, all, or none of the steps described above. For example, in certain embodiments, workstation 120, adaptation engine 130, and data store 140 may be combined to perform each step of method 200 from a single module. Furthermore, certain embodiments may perform these steps in a different order or in parallel. Moreover, one or more steps may be repeated. Although discussed as adaptation engine 130 performing these steps, any suitable component of system 100 may perform one or more steps of the method.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. An apparatus for providing secure and flexible inter-program communication, comprising:

a data store configured to store an ontology, the ontology comprising:
 a plurality of business semantics for an application;
 a plurality of data quality rules;
 a plurality of rules for storing data in a database comprising a plurality of securities identified using a Committee on Uniform Security Identification Procedures ("CUSIP") number; and
 a plurality of rules for displaying the data in a browser;
an interface communicatively coupled to the data store, the interface configured to receive from a workstation data to add to the database;
a processor communicatively coupled to the data store and the interface, the processor configured to:
 determine that the data is of a new datatype rather than an existing data type;
 in response to determining that the data is of the new datatype, update the ontology to describe the new datatype, wherein updating the ontology comprises:
  updating the plurality of rules for storing the new datatype in the database to indicate how the new datatype interacts with other datatypes in the database; and
  updating the plurality of rules for displaying the new datatype in the browser to indicate how the browser displays data of the new datatype and how viewers view data of the new datatype in the browser;
in response to updating the ontology, the processor is further configured to:
 schedule a backup of the database according to one or more of the plurality of data quality rules;
 consolidate files in the database according to one or more of the plurality of data quality rules;
 perform load balancing according to one or more of the plurality of data quality rules;
 generate a new column for the new datatype in the database; and
 communicate, to the workstation, the new datatype for display in the browser according to the updated plurality of rules for displaying the new datatype in the browser.

2. The apparatus of claim 1, wherein the database is a bi-temporal database and the ontology is a resource description framework ("RDF") ontology.

3. The apparatus of claim 1, wherein the ontology further comprises entitlement rules associated with data stored in the database, wherein the entitlement rules describe whether a user has access to the data according to a credential of the user.

4. The apparatus of claim 1, wherein the data quality rules describe how the processor should de-duplicate files in the database.

5. The apparatus of claim 1, wherein the processor is further configured to:
 identify that the data is received in a first format; and
 convert the data from the first format to a second format.

6. The apparatus of claim 5, wherein the first format is Extensible Markup Language ("XML") and the second format is RDF.

7. The apparatus of claim 1, wherein the ontology uses nouns to describe classes of objects and verbs to describe relationships between the objects.

8. A method for providing secure and flexible inter-program communication, comprising:

storing, using a processor, an ontology in a data store, wherein the ontology comprises:
- a plurality of business semantics for an application;
- a plurality of data quality rules;
- a plurality of rules for storing data in a database comprising a plurality of securities identified using a Committee on Uniform Security Identification Procedures ("CUSIP") number; and
- a plurality of rules for displaying the data in a browser;

receiving, using an interface communicatively coupled to the processor, from a workstation, data to add to the database;

determining that the data is of a new data type rather than an existing data type;

in response to determining that the data is of the new data type, updating, using the processor, the ontology to describe the new data type, wherein updating the ontology comprises:
- updating the plurality of rules for storing the new data type in the database to indicate how the new data type interacts with other datatypes in the database; and
- updating the plurality of rules for displaying the new data type in the browser to indicate how the browser displays data of the new data type and how viewers view data of the new data type in the browser;

in response to updating the ontology:
- scheduling a backup of the database according to one or more of the plurality of data quality rules;
- consolidating files in the database according to one or more of the plurality of data quality rules;
- performing load balancing according to one or more of the plurality of data quality rules;
- generating a new column for the new data type in the database; and
- communicating, to the workstation, the new data type for presentation in the browser according to the updated plurality of rules for displaying the new data type in the browser.

9. The method of claim 8, wherein the database is a bi-temporal database and the ontology is a resource description framework ("RDF") ontology.

10. The method of claim 8, wherein the ontology further comprises entitlement rules associated with data stored in the database, wherein the entitlement rules describe whether a user has access to the data according to a credential of the user.

11. The method of claim 8, wherein the data quality rules describe how the processor de-duplicates the data in the database.

12. The method of claim 8, wherein the processor is further configured to:
identify that the data is received in a first format; and
convert the data from the first format to a second format.

13. The method of claim 12, wherein the first format is Extensible Markup Language ("XML") and the second format is RDF.

14. The method of claim 8, wherein the ontology uses nouns to describe classes of objects and verbs to describe relationships between the objects.

15. One or more computer-readable non-transitory storage media embodying software that is operable when executed to:
store an ontology in a data store, wherein the ontology comprises:
- a plurality of business semantics for an application;
- a plurality of data quality rules;
- a plurality of rules for storing data in a database comprising a plurality of securities identified using a Committee on Uniform Security Identification Procedures (" CUSIP ") number; and
- a plurality of rules for displaying the data in a browser;

receive from a workstation data to add to the database;
determine that the data is of the new data type rather than an existing data type;

in response to determining that the data is of the new data type, update the ontology to describe the new data type, wherein updating the ontology comprises:
- updating the plurality of rules for storing the new data type in the database to indicate how the new data type interacts with other datatypes in the database; and
- updating the plurality of rules for displaying the new data type in the browser to indicate how the browser displays data of the new data type and how viewers view data of the new data type in the browser;

in response to updating the ontology:
- schedule a backup of the database according to one or more of the plurality of data quality rules;
- consolidate files in the database according to one or more of the plurality of data quality rules;
- perform load balancing according to one or more of the plurality of data quality rules;
- generate a new column for the new data type in the database; and
- communicate, to the workstation, the new data type for presentation in the browser according to the updated plurality of rules for displaying the new data type in the browser.

16. The media of claim 15, wherein the database is a bi-temporal database and the ontology is a resource description framework (RDF) ontology.

17. The media of claim 15, wherein the ontology further comprises entitlement rules associated with data stored in the database, wherein the entitlement rules describe whether a user has access to the data according to a credential of the user.

18. The media of claim 15, wherein the data quality rules describe how the processor de-duplicates the data in the database.

19. The media of claim 15, wherein the processor is further configured to:
identify that the data is received in a first format; and
convert the data from the first format to a second format.

20. The media of claim 15, wherein the first format is Extensible Markup Language ("XML") and the second format is RDF.

* * * * *

UNITED STATES PATENT AND TRADEMARK OFFICE
CERTIFICATE OF CORRECTION

PATENT NO. : 10,409,793 B2
APPLICATION NO. : 15/079823
DATED : September 10, 2019
INVENTOR(S) : Terence Smith Page 1 of 1

It is certified that error appears in the above-identified patent and that said Letters Patent is hereby corrected as shown below:

In the Claims

Column 12, Line 11, after "cedures", insert --(--.

Signed and Sealed this
Twenty-sixth Day of November, 2019

Andrei Iancu
*Director of the United States Patent and Trademark Office*